(12) United States Patent
Collado et al.

(10) Patent No.: US 12,415,599 B1
(45) Date of Patent: Sep. 16, 2025

(54) WING SPINDLE RETENTION

(71) Applicant: Textron eAviation Inc., Providence, RI (US)

(72) Inventors: Paul C. Collado, Wichita, KS (US); Perry George, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 0 days.

(21) Appl. No.: 18/814,793

(22) Filed: Aug. 26, 2024

(51) Int. Cl.
*B64C 29/00* (2006.01)
*B64D 27/40* (2024.01)

(52) U.S. Cl.
CPC .......... *B64C 29/0033* (2013.01); *B64D 27/40* (2024.01)

(58) Field of Classification Search
CPC . B64C 29/0033; B64C 29/0075; B64C 27/40; F16B 9/054; F16B 9/056
See application file for complete search history.

(56) References Cited

U.S. PATENT DOCUMENTS

| | | | |
|---|---|---|---|
| 7,913,947 B2 | 3/2011 | Haynes et al. | |
| 9,126,678 B2 | 9/2015 | Ross et al. | |
| 9,174,731 B2* | 11/2015 | Ross | B64C 29/0033 |
| 9,663,225 B1* | 5/2017 | Kooiman | B64C 29/0033 |
| 9,783,292 B2* | 10/2017 | Kooiman | B64D 35/00 |
| 9,809,318 B1* | 11/2017 | Williams | F16C 17/26 |
| 9,834,303 B2* | 12/2017 | Bockmiller | B64C 29/0033 |
| 9,841,333 B2* | 12/2017 | Ehinger | G01L 3/02 |
| 9,856,029 B2* | 1/2018 | King | B64D 27/40 |
| 9,868,541 B2* | 1/2018 | Kooiman | B64D 35/00 |
| 9,868,542 B2* | 1/2018 | Williams | B64C 29/0033 |
| 9,981,750 B2* | 5/2018 | Williams | B64D 27/40 |
| 10,029,802 B2* | 7/2018 | Williams | B64C 3/32 |
| 10,040,562 B2* | 8/2018 | Kooiman | B64C 29/0033 |
| 10,065,743 B2* | 9/2018 | King | B64D 35/08 |
| 10,378,978 B2* | 8/2019 | Ehinger | G01L 3/02 |
| 10,648,519 B2* | 5/2020 | Przybyla | B64C 27/30 |
| 10,654,569 B2* | 5/2020 | Mueller | F16C 19/548 |
| 10,882,612 B2* | 1/2021 | Mueller | F16C 25/06 |
| 10,994,839 B2* | 5/2021 | Kooiman | B64C 29/0033 |
| 11,060,562 B2* | 7/2021 | Olson | F16D 11/06 |
| 11,530,032 B2* | 12/2022 | Bosworth | B64C 29/0033 |
| 11,548,630 B2* | 1/2023 | Amante | F16C 3/02 |
| 11,787,536 B2* | 10/2023 | Kooiman | B64C 29/0033 244/12.4 |
| 11,852,232 B1* | 12/2023 | Speller | B64C 29/0033 |
| 11,975,826 B2* | 5/2024 | Knoll | B64C 27/28 |
| 12,202,599 B2* | 1/2025 | Olson | F16H 57/0442 |
| 2015/0048213 A1* | 2/2015 | Ross | B64C 29/0033 244/7 A |

(Continued)

*Primary Examiner* — Philip J Bonzell
(74) *Attorney, Agent, or Firm* — Avek IP, LLC

(57) ABSTRACT

A wing conversion system is configured to rotate an engine of a vertical takeoff and landing aircraft relative to a wing section between flight modes. The wing conversion system includes a spindle, a conversion actuator, a drive ring, and a holding element. The spindle is rotatably supported for rotation with the engine and relative to the wing section about a spindle axis. The drive ring is drivingly engaged between the spindle and the output shaft, with the output shaft and spindle being rotatable with each other about the spindle axis. The holding element engages the drive ring and urges the drive ring into engagement with the output shaft and spindle.

16 Claims, 11 Drawing Sheets

(56) References Cited

U.S. PATENT DOCUMENTS

| | | | |
|---|---|---|---|
| 2015/0048214 A1* | 2/2015 | Bockmiller | B64C 29/0033 |
| | | | 29/889.1 |
| 2016/0122039 A1* | 5/2016 | Ehinger | G01L 3/101 |
| | | | 73/862.08 |
| 2017/0137122 A1* | 5/2017 | Kooiman | B64F 5/40 |
| 2017/0225780 A1* | 8/2017 | Kooiman | B64C 27/12 |
| 2017/0305565 A1* | 10/2017 | Kooiman | B64C 27/22 |
| 2017/0305566 A1* | 10/2017 | Williams | B64D 27/40 |
| 2017/0305567 A1* | 10/2017 | Williams | B64C 29/0033 |
| 2017/0305568 A1* | 10/2017 | King | B64C 3/32 |
| 2018/0022462 A1* | 1/2018 | King | B64D 27/12 |
| | | | 244/54 |
| 2018/0067006 A1* | 3/2018 | Ehinger | B64F 5/60 |
| 2018/0099757 A1* | 4/2018 | Williams | B64C 27/26 |
| 2018/0099758 A1* | 4/2018 | Williams | B64C 3/32 |
| 2018/0099759 A1* | 4/2018 | Kooiman | B64C 3/32 |
| 2019/0277353 A1* | 9/2019 | Przybyla | B64C 11/00 |
| 2019/0301537 A1* | 10/2019 | Olson | F16D 1/108 |
| 2020/0031463 A1* | 1/2020 | Mueller | F16C 19/548 |
| 2020/0039642 A1* | 2/2020 | Kooiman | B64C 29/0033 |
| 2020/0189730 A1* | 6/2020 | Mueller | F16C 33/4623 |
| 2021/0094676 A1* | 4/2021 | Bosworth | B64C 27/001 |
| 2021/0197964 A1* | 7/2021 | Amante | F16C 19/54 |
| 2021/0318143 A1* | 10/2021 | Beall | F16H 19/001 |
| 2022/0073198 A1* | 3/2022 | Kooiman | B64C 29/0033 |
| 2022/0242557 A1* | 8/2022 | Knoll | B64D 35/021 |
| 2024/0166345 A1* | 5/2024 | Olson | F16H 57/0435 |
| 2024/0246665 A1* | 7/2024 | Knoll | B64D 27/34 |

\* cited by examiner

WING SPINDLE RETENTION

BACKGROUND

1. Field

Embodiments of the invention relate generally to aircraft structures with actuator devices. More specifically, the disclosed embodiments are related to wing conversion system associated with Vertical Takeoff and Landing (VTOL) aircraft.

2. Related Art

It is known in the art for a tiltrotor aircraft to include an actuator mechanism for converting the aircraft between flight modes. For instance, U.S. Pat. No. 7,913,947 to Haynes et al. describes a system to pivot a pylon between two different flight modes. The system in Haynes has the actuator offset from the axis of rotation. U.S. Pat. No. 9,126,678 to Ross et al. describes the use of a linear actuator or rotary actuator, with a gear box coupling to a spindle. U.S. Pat. No. 9,663,225 to Kooiman et al. describes the use of a quill shaft with splined portions. U.S. Patent Application No. 2019/0277353 to Przybyla et al. describes a torque coupling mechanism with friction cones.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a wing conversion system is configured to rotate an engine of a vertical takeoff and landing aircraft relative to a wing section between flight modes. The wing conversion system broadly includes a spindle, a conversion actuator, a drive ring, and a holding element. The spindle is rotatably supported for rotation with the engine and relative to the wing section about a spindle axis. The conversion actuator is operable to rotate the spindle and includes a tubular output shaft, with the spindle axially extending at least partly through, and coaxial with, the output shaft. The drive ring is drivingly engaged between the spindle and the output shaft, with the output shaft and spindle being rotatable with each other about the spindle axis. The spindle and the drive ring include respective splines removably intermeshed with one another so that the spindle and drive ring rotate together. The output shaft and the drive ring include respective drive elements removably engaged with one another so that the output shaft and drive ring rotate together. The holding element engages the drive ring and urges the drive ring into engagement with the output shaft and spindle.

In another embodiment, a method of assembling a wing conversion system configured to rotate an engine of a vertical takeoff and landing aircraft relative to a wing section between flight modes is provided. The wing conversion system includes a spindle rotatably supported for rotation with the engine and a conversion actuator having a tubular output shaft. The method broadly includes the steps of extending the spindle axially through at least part of the output shaft; drivingly engaging a drive ring with the spindle and the output shaft so that the output shaft and spindle are rotatable with each other about the spindle axis; and engaging a holding element with the drive ring to urge the drive ring into engagement with the output shaft and spindle.

BRIEF DESCRIPTION OF THE DRAWING FIGURES

Embodiments of the invention are described in detail below with reference to the attached drawing figures, wherein.

Figure 1:
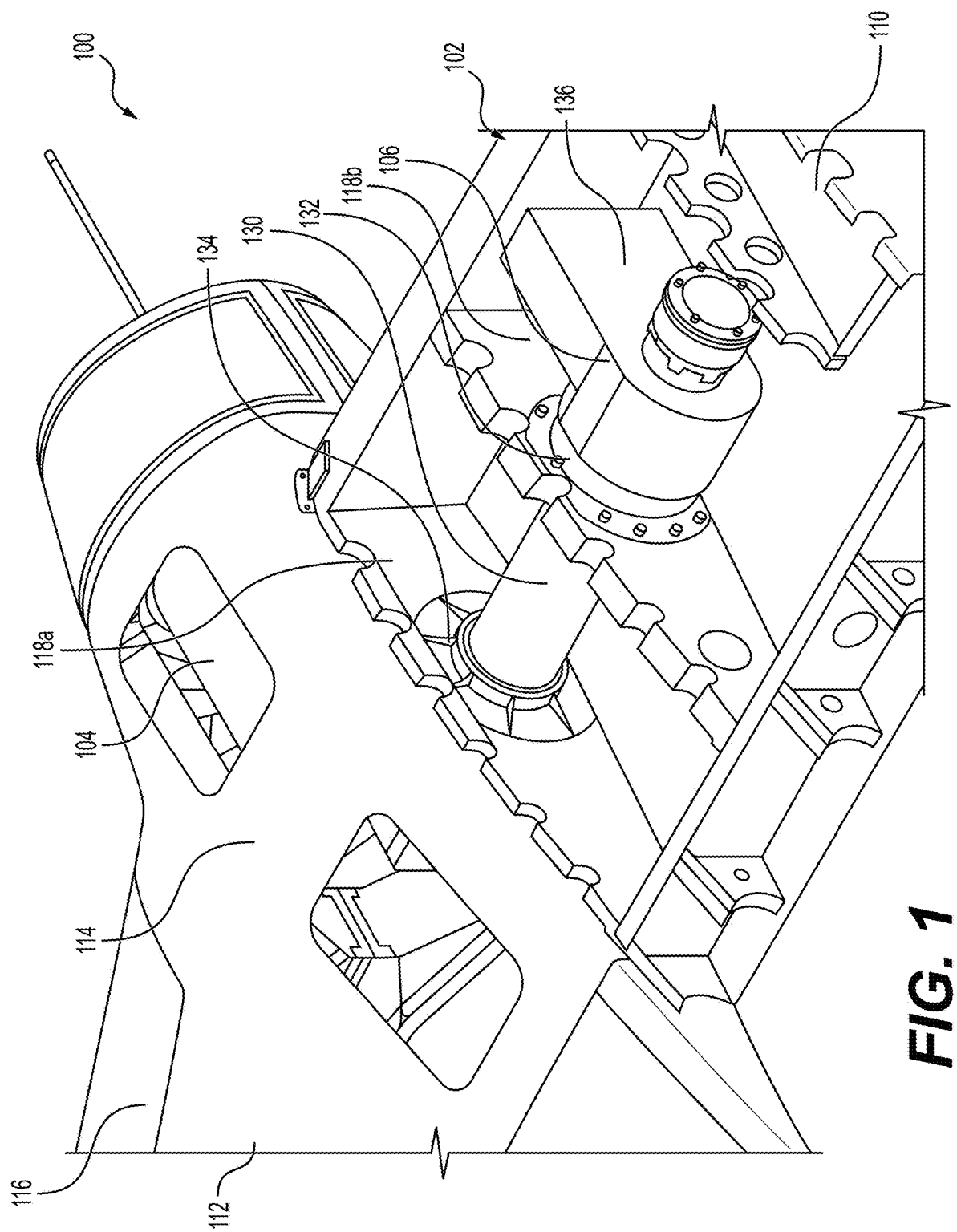
FIG. 1 is a fragmentary perspective view of a VTOL aircraft including a wing, engine, and an embodiment of a wing conversion system, with parts of the wing being removed to depict the wing conversion system supported relative to partitions of the wing.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft utilize a powered actuator as part of a wing conversion system. Upon liftoff of the aircraft, the wing and rotor may be converted from a vertical propulsion mode to a horizontal propulsion mode. Conversely, in preparation for landing of the aircraft, the wing and rotor may be converted from the horizontal propulsion mode to the vertical propulsion mode.

Embodiments of the disclosure provide a wing conversion system, and a method of operating the system. FIG. 1 shows a perspective view of an embodiment showing incorporation of the disclosed embodiments into a vertical takeoff and landing (VTOL) aircraft 100. Embodiments of the wing conversion system of VTOL aircraft 100 may provide a spindle powered by an actuator mechanism with high torque while minimizing both rotational and axial free play between the actuator and spindle.

Turning to FIG. 1, embodiments of VTOL aircraft 100 may include a fuselage (not shown) mounted relative to a laterally extending wing 102. One or more engines 104, which may be used to drive one or more propellers (not shown), may be operably supported relative to the fuselage and wing 102 to provide aircraft propulsion. It is within the scope of the disclosure for embodiments of the aircraft to have an alternative fuselage and/or an alternative wing structure. The VTOL aircraft 100 may include the wing 102, engine 104, and a wing conversion system 106.

The depicted wing 102 may include an inboard wing section 110 and an outboard wing section 112 that extend laterally relative to one another and relative to the fuselage. Outboard wing section 112 may include a wing nacelle 114, which operably receives a respective engine 104. Wing sections 110 and 112 may include an outer skin 116 supported by partitions 118a and 118b. In the usual manner, partitions 118a and 118b are spaced laterally from one another to reinforce the wing structure.

The VTOL aircraft 100 may be configured for conversion between a horizontal flight mode (see FIG. 1), where the engine is in a horizontal orientation, and a vertical flight mode (not shown), where the engine is in a vertical orientation. The wing sections 110 and 112 may be shiftably attached relative to one another to facilitate shifting of the engine 104 relative to the inboard wing section 110 between the horizontal flight mode and the vertical flight mode. As will be described, the wing conversion system 106 may pivotally interconnect the wing sections 110 and 112 and may permit common rotation of the outboard wing section 112, the engine 104, and the propeller with each other about a lateral spindle axis A and relative to the inboard wing section 110.

Referring to FIGS. 1-6, the wing conversion system 106 may comprise a powered mechanism for rotating the outboard wing section 112. Embodiments of the wing conversion system 106 may broadly include a conversion spindle 130, an inboard bearing block 132, an outboard bearing block 134, and a conversion actuator 136. As will be described, the conversion spindle 130 may be fixed relative to the engine 104 and the outboard wing section 112 for rotation therewith about the lateral spindle axis A. The conversion actuator 136 may be configured to rotate the conversion spindle 130, along with the engine 104 and the outboard wing section 112, about the lateral spindle axis A for shifting the wing 102, engine 104, and propeller between the horizontal propulsion mode and the vertical propulsion mode.

The depicted conversion actuator 136 may be drivingly attached relative to the conversion spindle 130 and operable to rotate the conversion spindle 130 between positions associated with the vertical propulsion mode and the horizontal propulsion mode. Conversion actuator 136 may include an actuator housing 138, a motor 140, a transmission (not shown), and a tubular output shaft 142 powered by the motor 140 (see FIG. 2A). The actuator housing 138 of conversion actuator 136 may be fastened relative to the corresponding partition 118b.

The conversion spindle 130 may include an elongated tubular structure with an inboard section 130a and an outboard section 130b. Conversion spindle 130 may define a shoulder 144 located between the inboard section 130a and outboard section 130b (see FIG. 3). Shoulder 144 may abut an outboard end of the tubular output shaft 142. Inboard section 130a may include a splined portion 146 and a threaded portion 148 extending from the splined portion 146 to an inboard end 150 (see FIGS. 2B and 4). As will be described, the inboard section 130a of conversion spindle 130 may be removably, drivingly attached to the output shaft 142 when assembling the wing conversion system 106.

Figure 5:
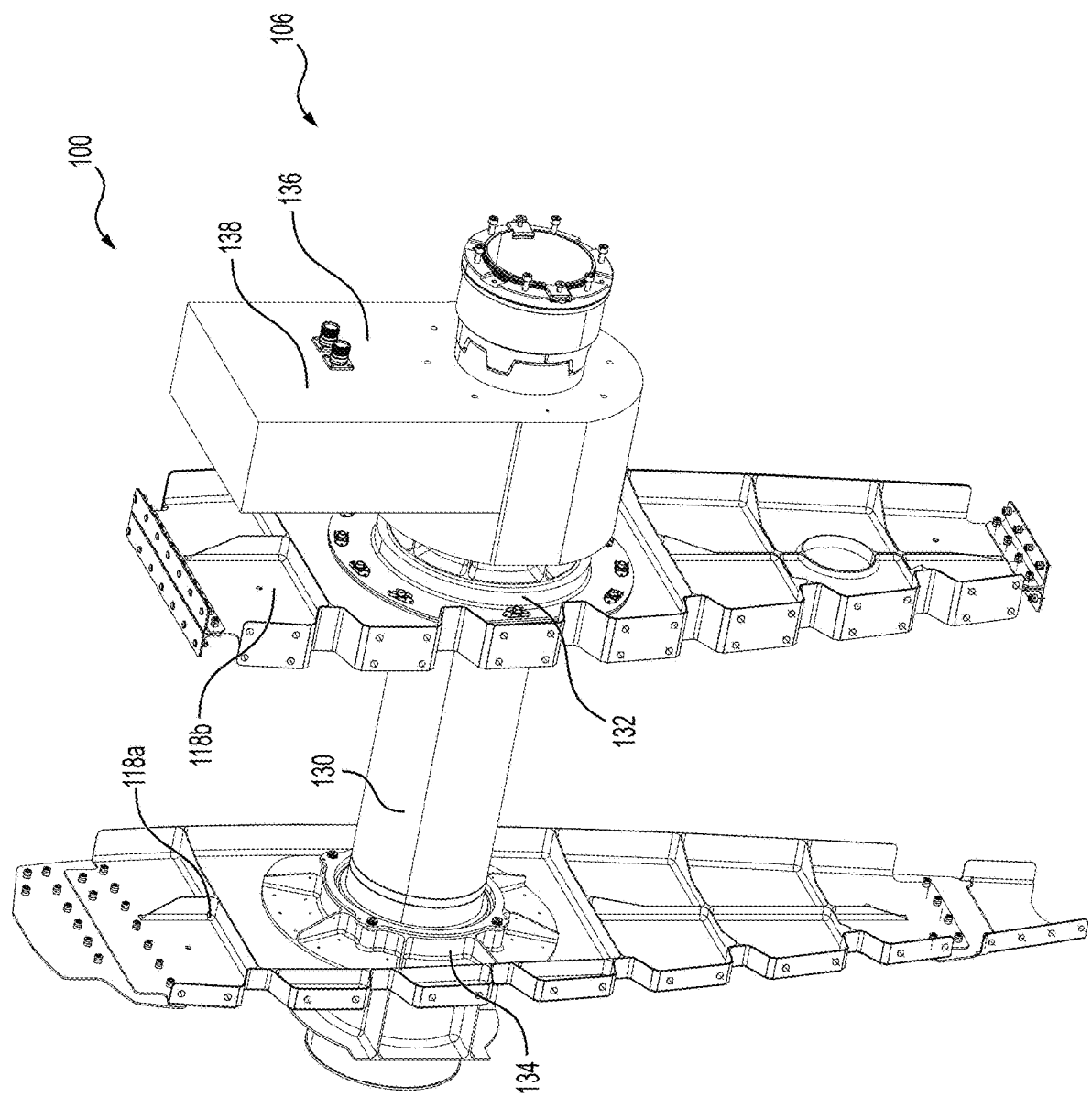
FIG. 5 is a fragmentary perspective view of the VTOL aircraft shown in FIG. 1.
Figure 6:
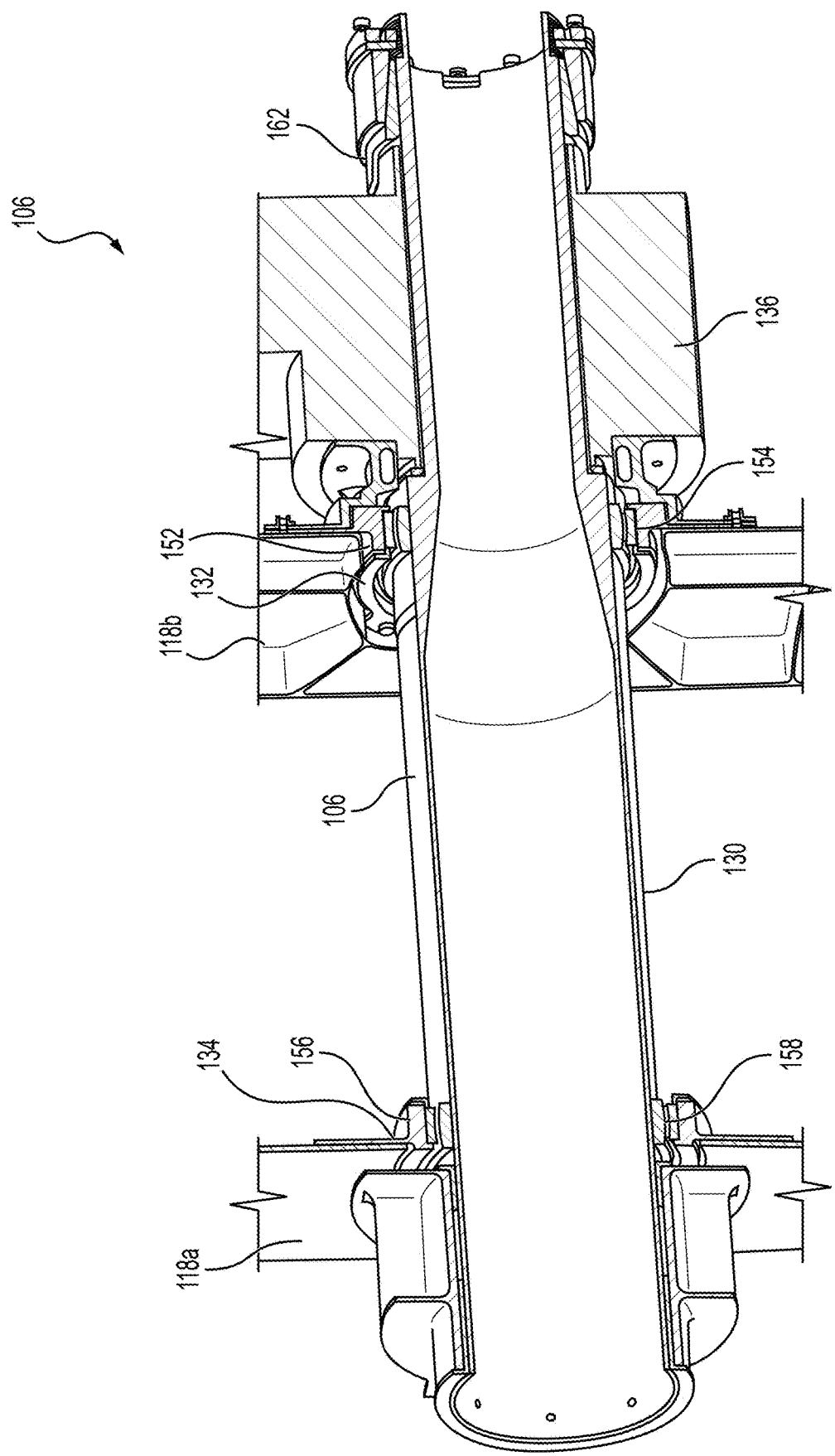
FIG. 6 is a fragmentary cross-sectional view of the VTOL aircraft shown in FIGS. 1 and 6.

Conversion spindle 130 may be rotatably supported relative to the inboard wing section 110 by inboard bearing block 132 and outboard bearing block 134 (see FIGS. 1, 5, and 6). Inboard bearing block 132 may include a bearing housing 152 associated with partition 118b and an inboard roller bearing 154 operably supported within the bearing housing 152 (see FIGS. 3 and 6). Similarly, outboard bearing block 134 may include a bearing housing 156 associated with partition 118a and an outboard roller bearing 158 operably supported within the bearing housing 152 (see FIG. 6). Thus, the inboard bearing block 132 and outboard bearing block 134 may be mounted relative to the inboard wing section 110 and spaced along an axial length of the spindle 130. The conversion actuator 136 may be mounted adjacent the inboard bearing block 132 and configured to rotatably receive the spindle 130.

The inboard roller bearing 154 and outboard roller bearing 158 may rotatably support the conversion spindle 130 and permit spindle rotation relative to the inboard wing section 110 about the spindle axis A. In the depicted embodiment, the inboard roller bearing 154 and outboard roller bearing 158 are mounted on the outboard section 130b of the conversion spindle 130. The inboard section 130a may extend axially at least partly through the output shaft 142 of the conversion actuator 136. Preferably, when assembling the wing conversion system 106, the inboard section 130a of spindle 130 extends entirely through and is generally coaxial with the output shaft 142.

An inboard drive section 160 of the output shaft 142 may be drivingly attached to the inboard section 130a by a split drive ring 162. The split drive ring 162 may include drive ring halves 164 and 166 (see FIGS. 2A and 2B). The drive ring halves 164 and 166 may comprise arcuate drive ring sections that are identical to one another and arranged circumferentially. Each drive ring half 164 and 166 may have a curved body with an inboard portion 168 to engage the conversion spindle 130 and an outboard portion 170 to engage the output shaft 142 (see FIG. 4). In the illustrated embodiment, the inboard portion 168 may present inner splines 172 that receive and drivingly engage outer splines 174 of splined portion 146 of inboard section 130a (see FIG. 4). Thus, the splines 172 and 174 may be removably intermeshed with one another so that the spindle 130 and drive ring 162 rotate together. Inboard portion 168 of each drive ring half 164 and 166 may also present an outer tapered surface 176 (see FIG. 4).

Figure 2A:
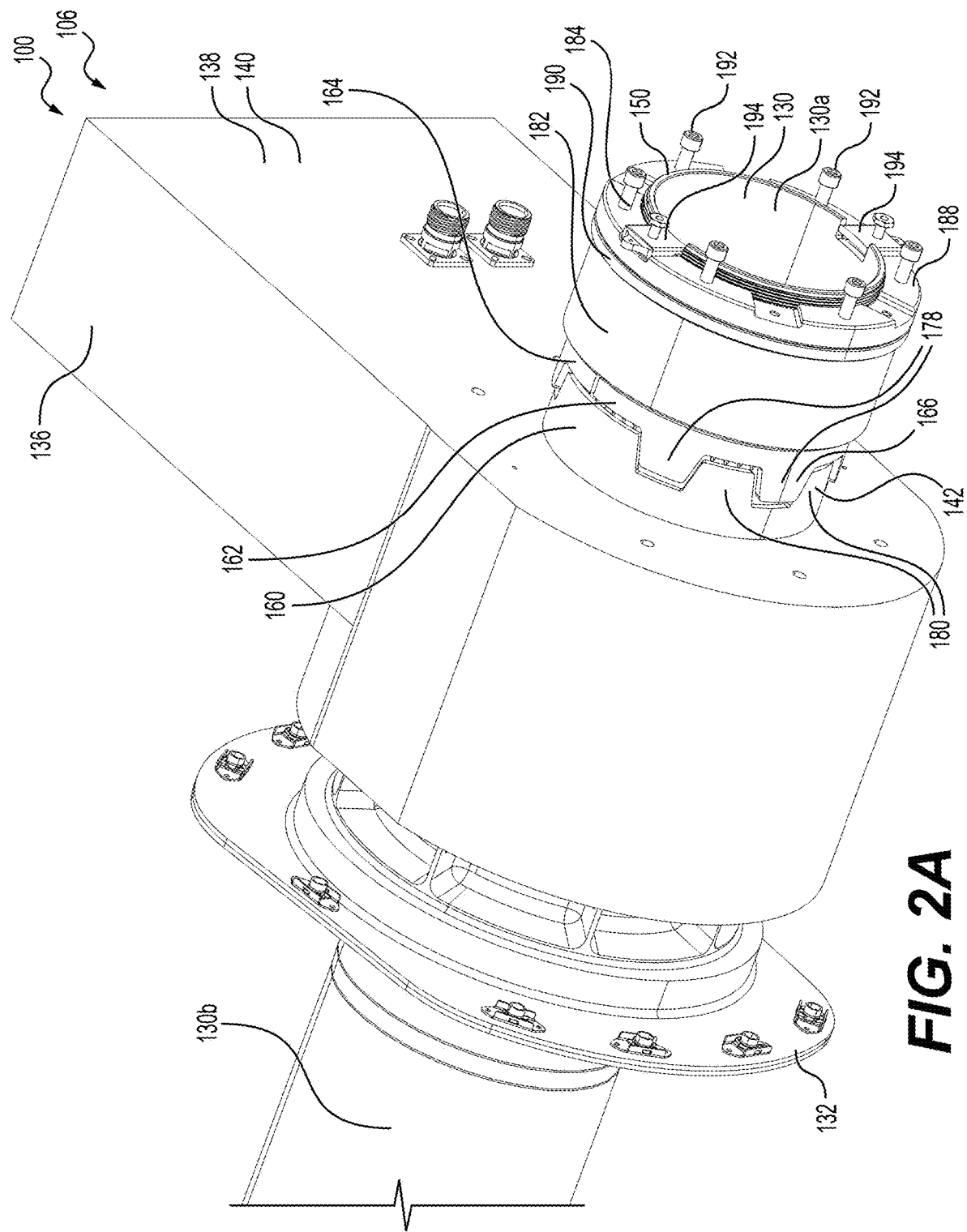
FIG. 2A is a fragmentary perspective view of the wing conversion system shown in FIG. 1, depicting a conversion spindle, bearing blocks, and a conversion actuator.
Figure 2B:
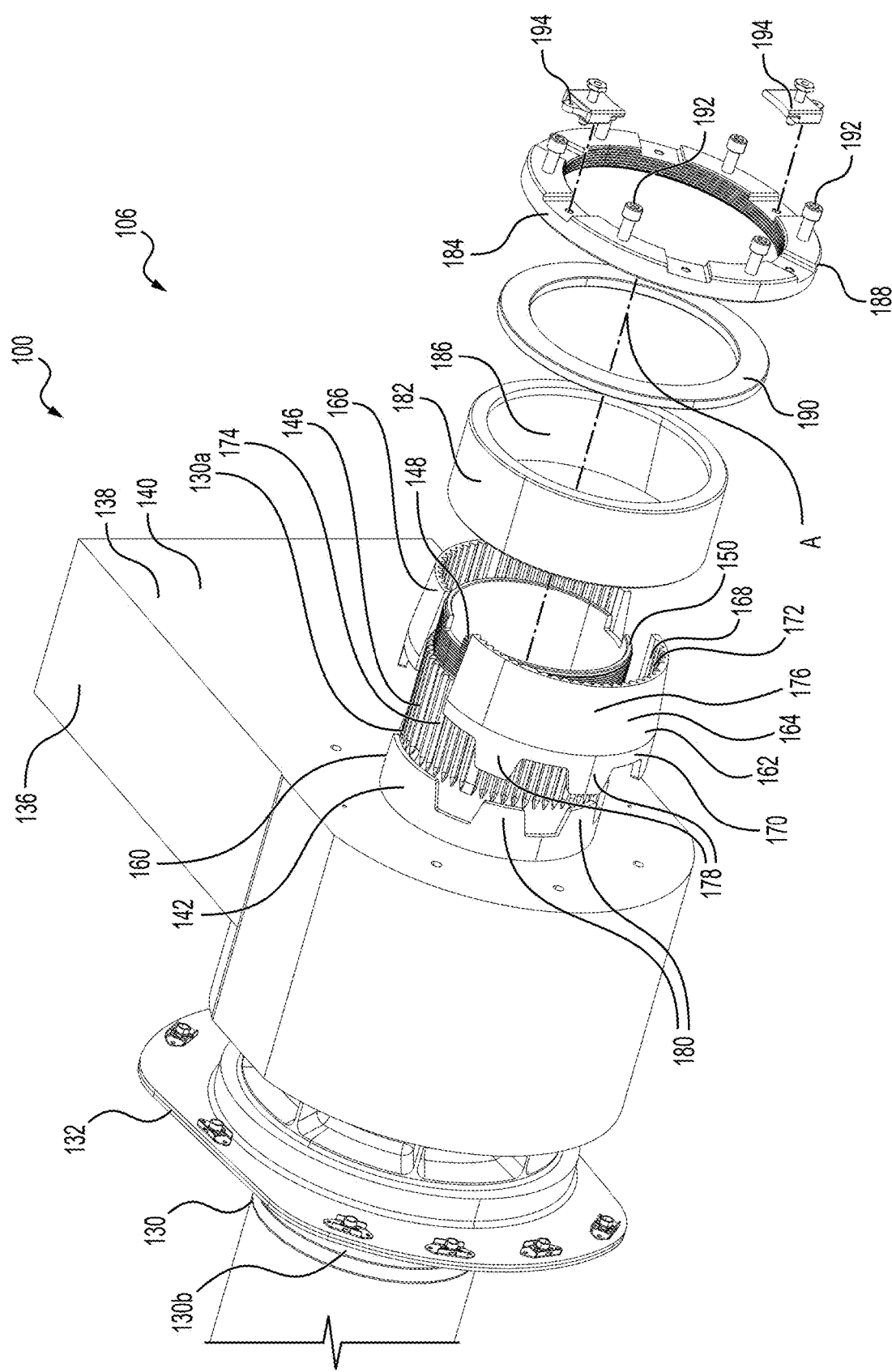
FIG. 2B is a fragmentary perspective view of the wing conversion system similar to FIG. 2A, but showing a drive ring, compression ring, and retention nut of the wing conversion system exploded from the conversion spindle and the conversion actuator.
Figure 3:
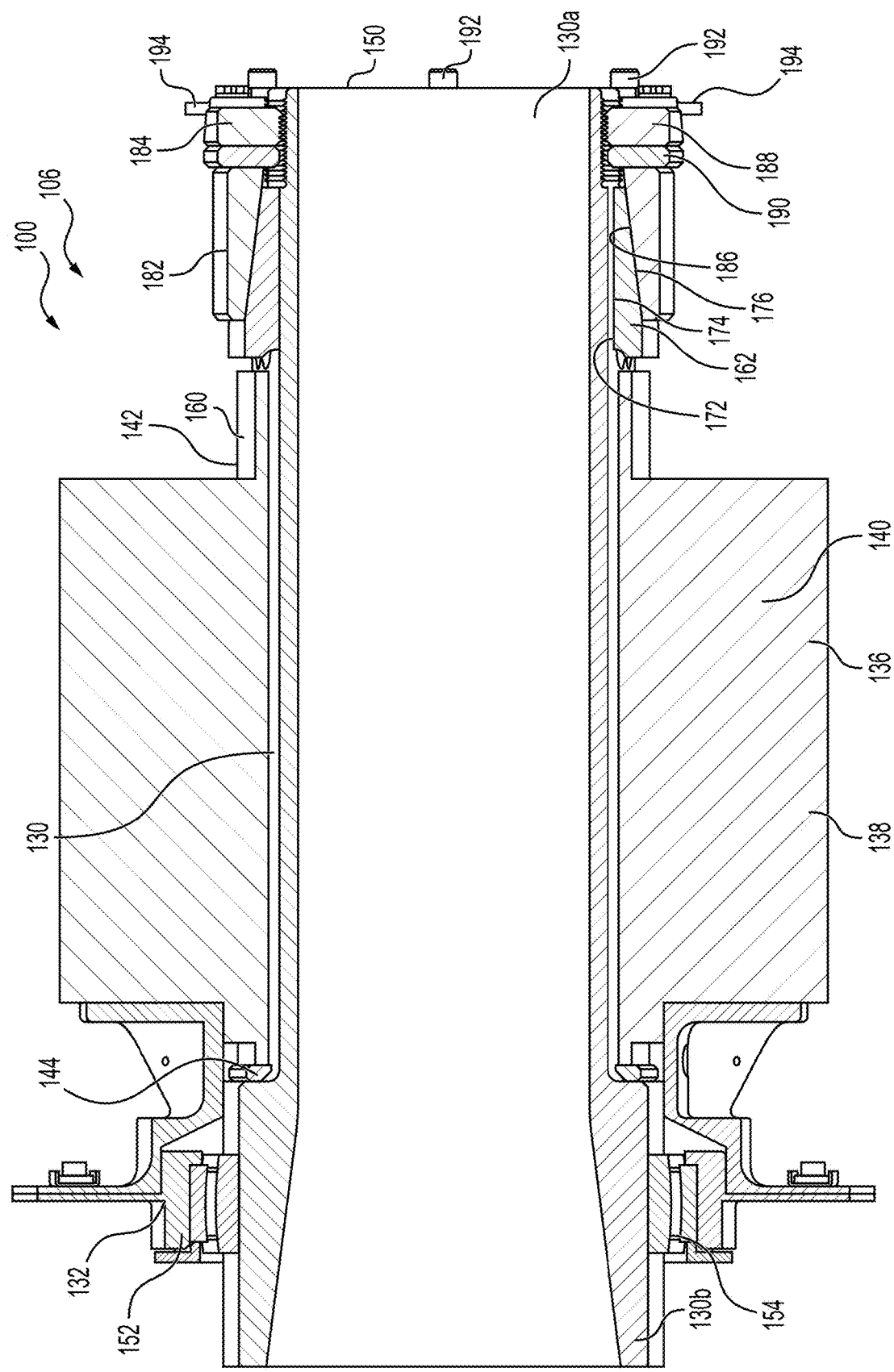
FIG. 3 is a fragmentary cross-sectional view of the wing conversion system shown in FIGS. 1-2B, depicting the drive ring engaged with an output shaft of the conversion actuator and a splined portion of the conversion spindle, with the drive ring secured by the compression ring and the retention nut.

The depicted outboard portion 170 may have circumferentially spaced drive dogs 178 (see FIGS. 2A and 2B). The drive dogs 178 of drive ring halves 164 and 166 may be removably intercalated with drive dogs 180 of the output shaft 142 (see FIGS. 2A and 2B) so that the drive ring 162 is removably engaged with the output shaft 142. That is, the drive dogs 178 and 180 comprise drive elements that are removably engaged with one another so that the output shaft 142 and drive ring 162 rotate together. Although the illustrated drive dogs 178 and drive dogs 180 are preferred for providing removable driving engagement between the drive ring 162 and output shaft 142, embodiments of the drive ring and/or the output shaft may have alternative drive elements (such as splines) for providing removable driving engagement between the drive ring and output shaft.

When assembling the wing conversion system 106, the drive ring 162 may be removably drivingly engaged with the spindle 130 and the output shaft 142 so that the output shaft 142 and spindle 130 are rotatable with each other about the spindle axis A. For instance, the drive ring 162 may first be positioned on the spindle 130 so that splines 172 and 174 may be removably intermeshed with one another. This may be accomplished by moving the separated drive ring halves 164 and 166 radially toward each other until the drive ring halves 164 and 166 both engage the splines 174 of spindle 130. Alternatively, the drive ring halves 164 and 166 may first be brought together (e.g., by partly inserting the drive ring halves 164 and 166 into conical compression ring 182) and then moved axially onto the splines 174 of spindle 130. With the drive ring 162 located on the spindle 130, the drive ring 162 may be shifted axially to removably engage drive elements of the drive ring 162 and output shaft 142 with each other so that the drive ring 162 and output shaft 142 rotate together.

While the drive ring preferably includes a pair of drive ring sections, it is also within the scope of various embodiments for the drive ring to include an alternative number of drive ring sections. For instance, various drive ring embodiments may include three or more drive ring sections arranged circumferentially. In at least certain embodiments, the drive ring may comprise a unitary ring structure.

The wing conversion system 106 may further include the conical compression ring 182 and a retention nut 184 that cooperatively secure the split drive ring 162 in engagement with the output shaft 142 and the conversion spindle 130. Compression ring 182 may comprise an endless holding element that engages the drive ring 162 to urge the drive ring 162 into engagement with the output shaft 142 and spindle 130. Compression ring 182 may include an endless compression ring structure that presents an inner tapered surface 186 (see FIGS. 3 and 4). The compression ring 182 may be sized to at least partly receive the split drive ring 162. Furthermore, the inner tapered surface 186 and the outer tapered surface 176 of the split drive ring 162 may be complementally shaped so that the compression ring 182 urges the split drive ring 162 into engagement with the conversion spindle 130 and the output shaft 142 (see FIGS. 3 and 4). In the depicted embodiment, the outer tapered surface 176 of the split drive ring 162 and the inner tapered surface 186 of the compression ring 182 may both comprise conical surfaces. However, embodiments of the outer tapered surface and/or the inner tapered surface may have alternative tapered surfaces that are complemental (such as planar surface shapes).

When assembling the wing conversion system 106, compression ring 182 may provide a holding element that urges the drive ring 162 into engagement with the output shaft 142 and spindle 130. As the compression ring 182 is shifted axially (in an outboard direction) into further engagement with the split drive ring 162, the radial force applied by the compression ring 182 onto the split drive ring 162 is increased (see FIG. 4). It will be appreciated that the compression ring 182 may apply a radial force that urges the ring sections (such as drive ring halves 164 and 166) toward one another and into engagement with the spindle 130. Again, axial movement of the compression ring 182 relative to the split drive ring 162 may also urge the drive ring 162 axially into engagement with the output shaft 142.

While the compression ring 182 may provide a preferred holding element to position the drive ring 162 in engagement with the output shaft 142 and spindle 130, embodiments may include an alternative holding element. For example, embodiments of a holding element may include a plurality of discrete elements (such as elements spaced circumferentially along the drive ring) supported relative to one another. In various embodiments, a plurality of discrete elements may be supported relative to one another to cooperatively engage the drive ring. It will also be appreciated that one or more discrete elements may present tapered surfaces. Similar to the inner tapered surface 186, tapered surfaces of one or more discrete elements may engage the outer tapered surface of the drive ring.

The retention nut 184 may be used to apply a retention force to the compression ring 182 for securing the split drive ring 162 in engagement with the conversion spindle 130 and the output shaft 142. Retention nut 184 may include a flange 188, washer 190, fasteners 192, and locking tabs 194.

Figure 4:
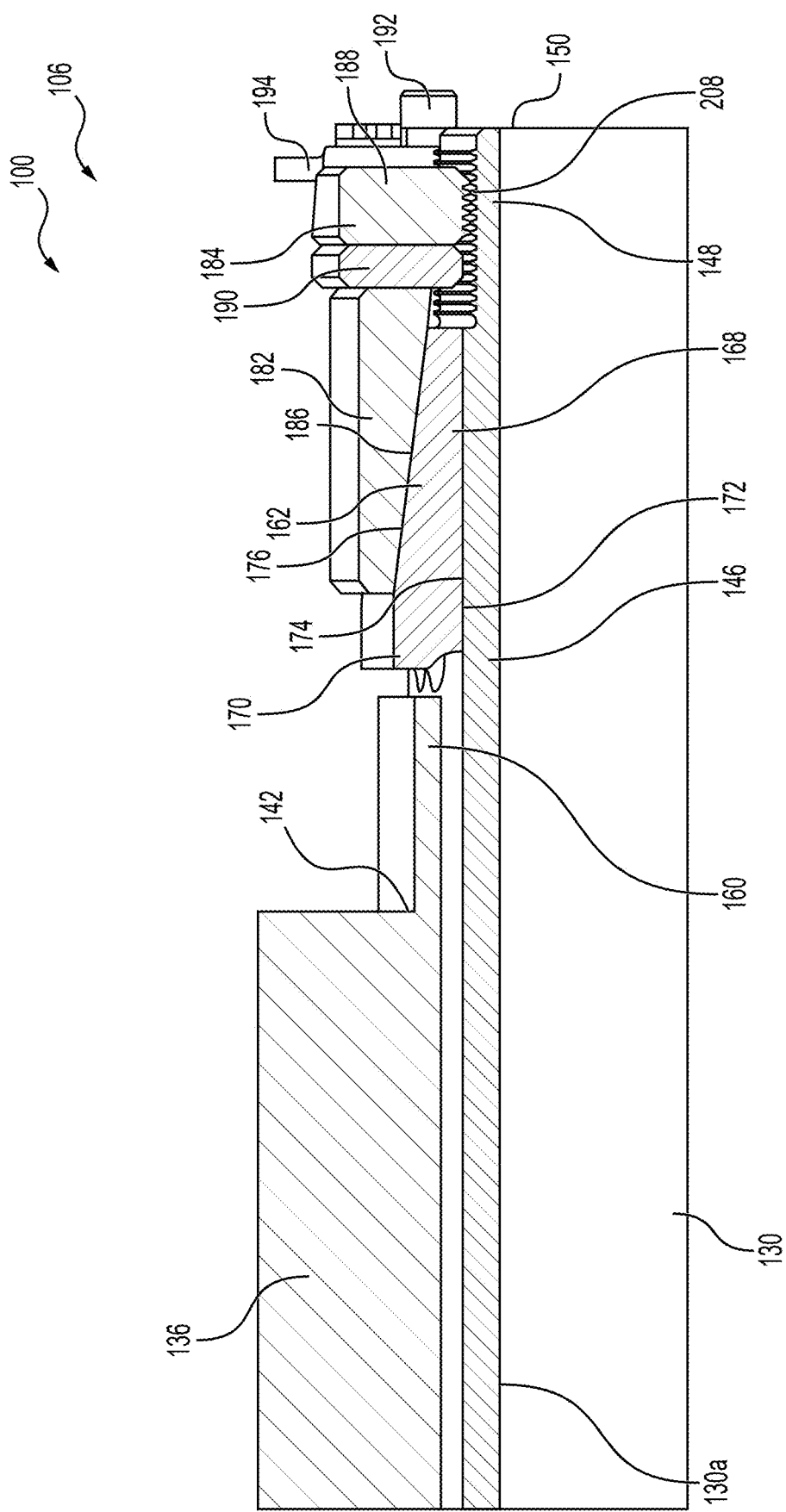
FIG. 4 is an enlarged fragmentary cross-sectional view of the wing conversion system shown in FIGS. 1-3.
Figure 7:
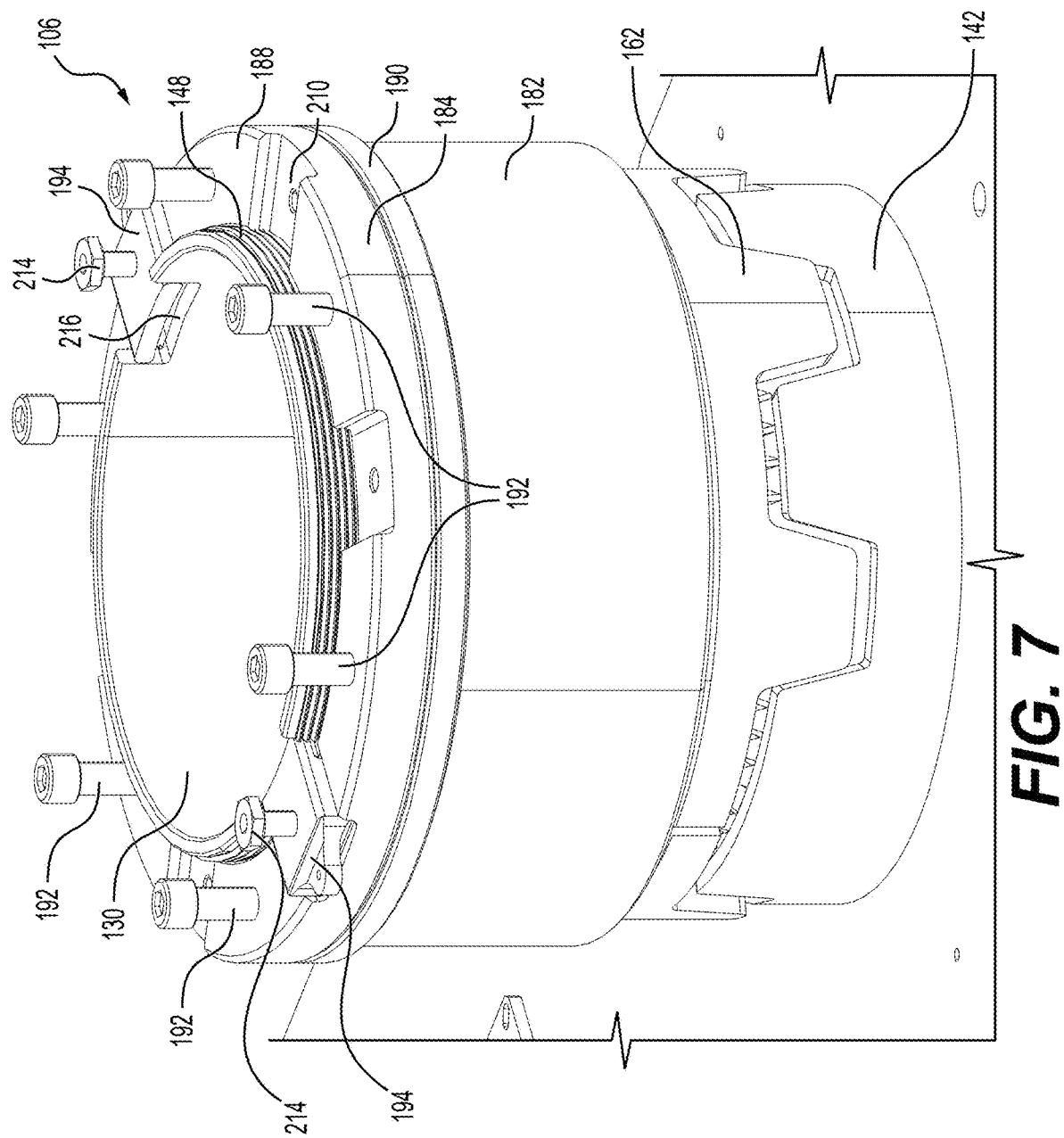
FIG. 7 is a fragmentary perspective view of the wing conversion system shown in FIGS. 1-6, depicting the drive ring engaged with the output shaft and the spindle and secured by the compression ring and the retention nut.

Turning to FIGS. 7-10, flange 188 may define a threaded bore 208 (see FIG. 10) that permits the flange 188 to be selectively threaded onto the threaded portion 148 of the conversion spindle 130 (see FIGS. 4 and 7). Flange 188 may also present radial slots 210 (see FIG. 10). Washer 190 may define a smooth bore 212 (see FIG. 10) that is not threaded so that the washer 190 may be freely slidable on the threaded portion 148 without being threadedly engaged with the threaded portion 148. Fasteners 192 may comprise set screws that are threaded into respective openings in the flange 188 and abuttingly engaged with the washer 190 (see FIGS. 7 and 8).

The fasteners 192 may be axially shiftable relative to the flange 188 by threading the fasteners 192 into the flange 188. Fasteners 192 may be axially shifted to move the washer 190 axially relative to the drive ring 162 (such as outboard movement of the washer 190 toward the output shaft 142). As a result, fasteners 192 and washer 190 may be axially shifted to move a holding element (such as the compression ring 182) axially relative to the drive ring 162 (such as outboard movement of the compression ring 182 toward the output shaft 142).

Figure 8:
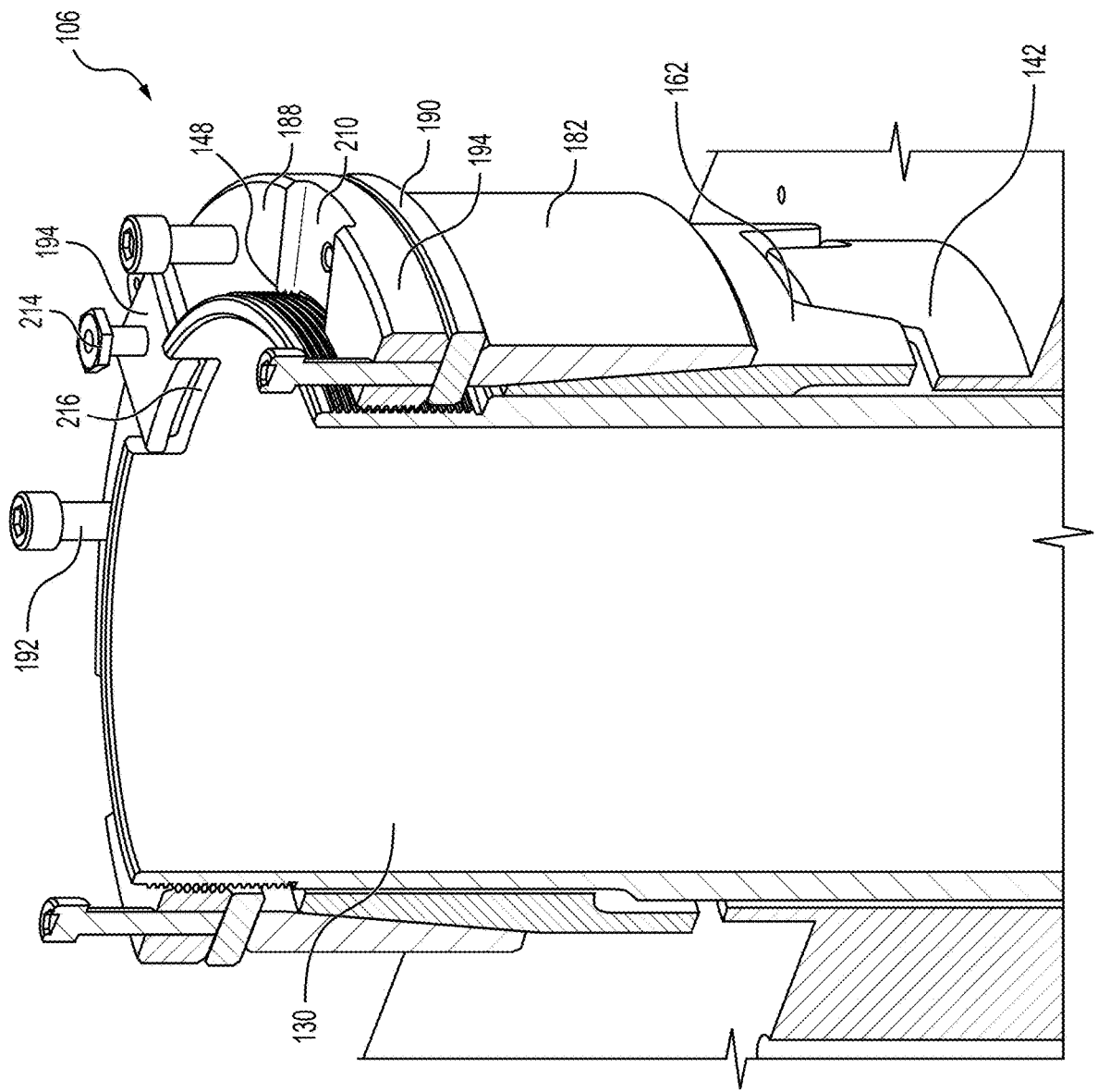
FIG. 8 is a fragmentary perspective view of the wing conversion system similar to FIG. 7, but showing the wing conversion system cross sectioned along a transverse section line.
Figure 9:
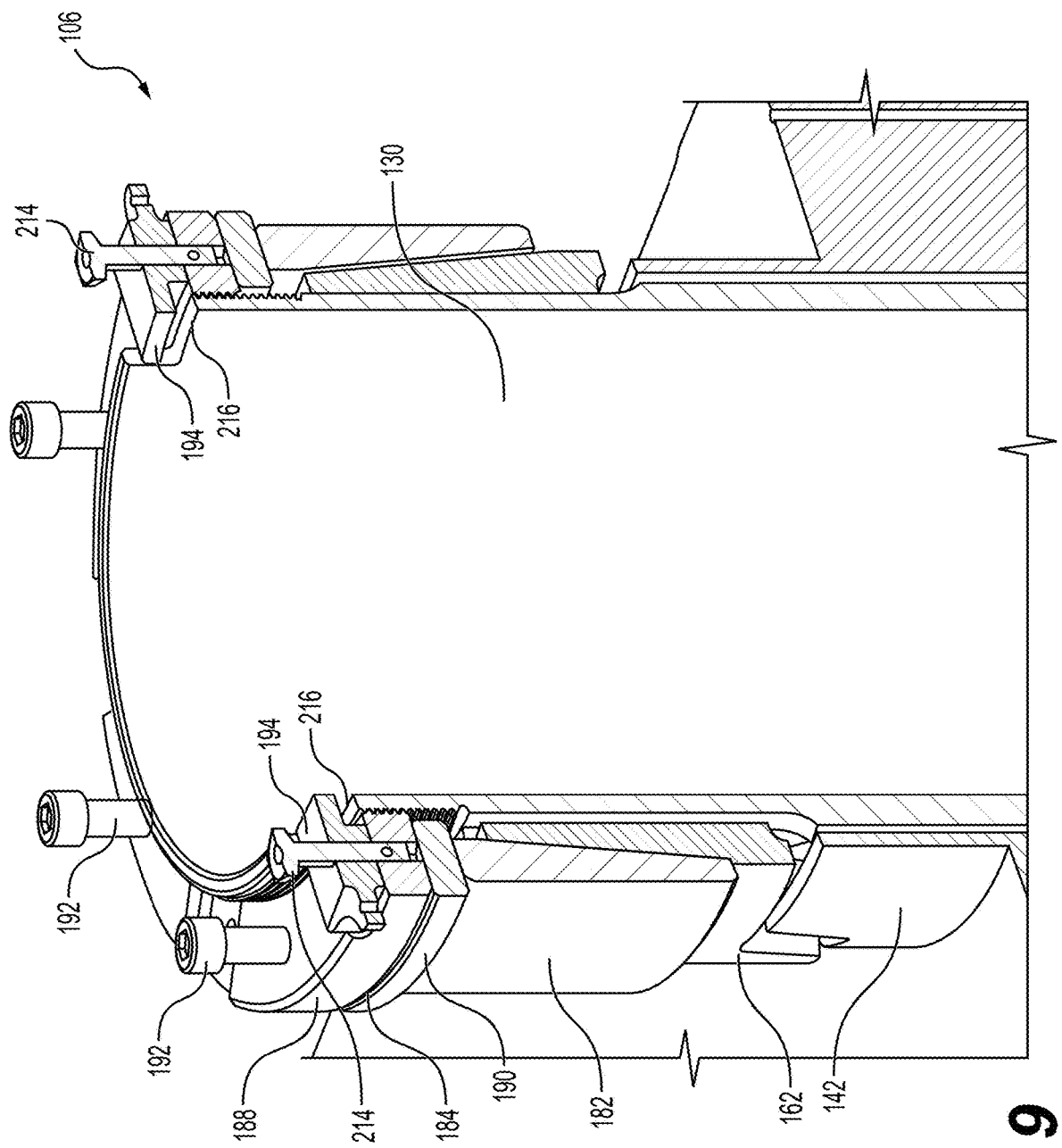
FIG. 9 is a fragmentary perspective view of the wing conversion system similar to FIG. 7, but showing the wing conversion system cross sectioned along a transverse section line perpendicular to the section line of FIG. 8.
Figure 10:
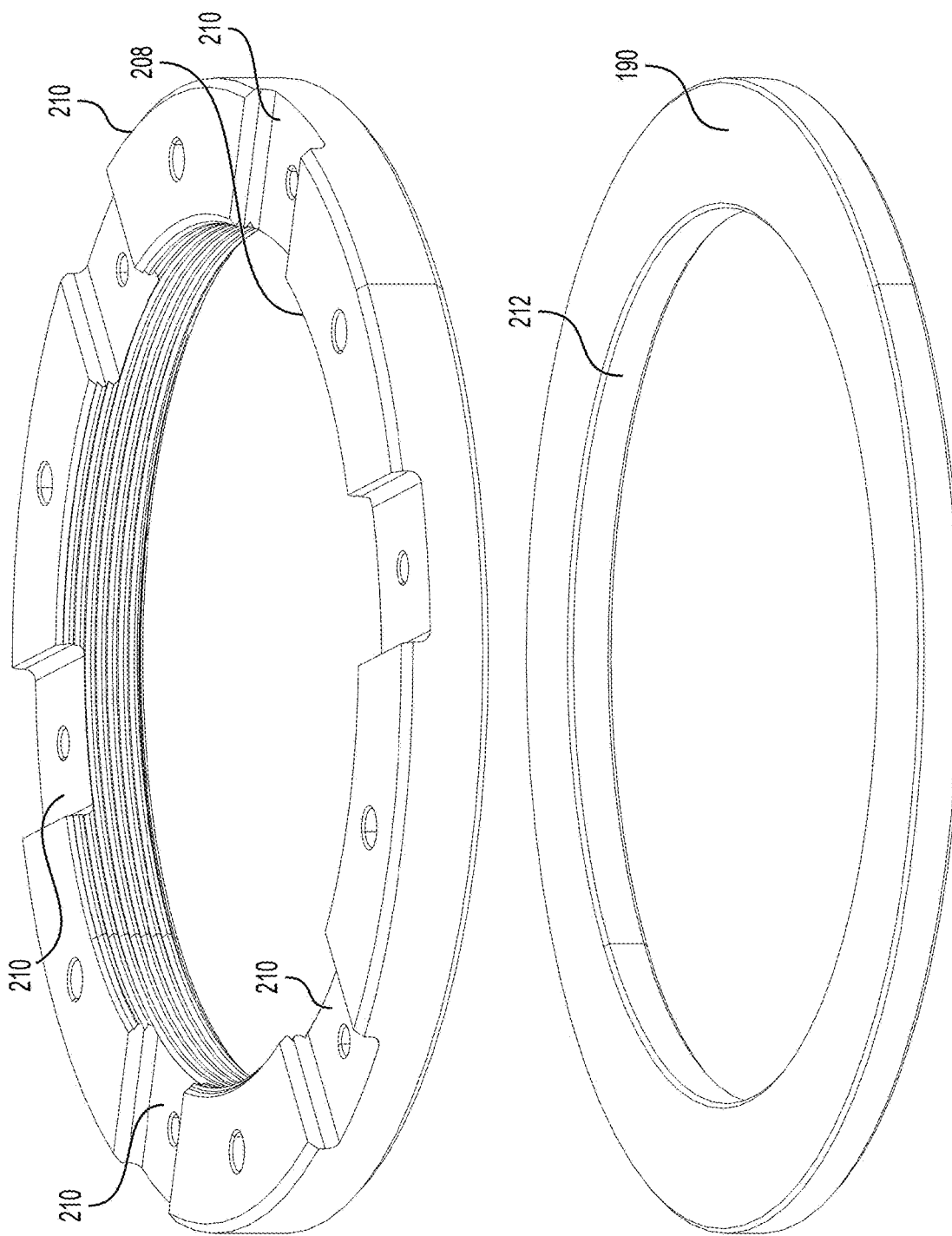
FIG. 10 is a perspective view of a flange and a washer of the retention nut.

Locking tabs 194 of the retention nut 184 may be removably secured to the flange 188 with fasteners 214 and project radially inwardly from the flange 188 for engagement with slots 216 presented by the conversion spindle 130 (see FIGS. 7-9). The locking tabs 194 and conversion spindle 130 may be engaged with each other to restrict rotational threading movement of the retention nut 184 relative to the conversion spindle 130.

The threads of flange 188 may permit axial positioning of the retention nut 184 along the conversion spindle 130. Thus, flange 188 permits retention nut 184 to be threaded into a position relative to the compression ring 182 (such as a position adjacent to or in engagement with the compression ring 182). The fasteners 192 may be used to shift the washer 190 axially relative to the flange 188. For example, with the retention nut 184 held onto the conversion spindle 130 by the locking tabs 194, fasteners 192 may be threaded toward the washer 190 to advance the washer 190 into engagement with the compression ring 182. Similarly, fasteners 192 may advance the washer 190 so that the washer 190 applies a gradually increasing force against the compression ring 182.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A wing conversion system configured to rotate an engine of a vertical takeoff and landing aircraft relative to a wing section between flight modes, said wing conversion system comprising:
    a spindle rotatably supported for rotation with the engine and relative to the wing section about a spindle axis;
    a conversion actuator operable to rotate the spindle and including a tubular output shaft, with the spindle axially extending at least partly through, and coaxial with, the output shaft;
    a drive ring being drivingly engaged between the spindle and the output shaft, with the output shaft and spindle being rotatable with each other about the spindle axis, said spindle and said drive ring including respective splines removably intermeshed with one another so that the spindle and drive ring rotate together,
    said output shaft and said drive ring including respective drive elements removably engaged with one another so that the output shaft and drive ring rotate together; and
    a holding element engaging the drive ring and urging the drive ring into engagement with the output shaft and spindle.

2. The wing conversion system as claimed in claim 1, said drive ring and holding element presenting respective tapered surfaces that are complementarily shaped and slidably engaged with each other, with axial movement of the holding element relative to the drive ring operable to urge the drive ring axially into engagement with the output shaft and radially into engagement with the spindle.

3. The wing conversion system as claimed in claim 2, said holding element comprising an endless compression ring.

4. The wing conversion system as claimed in claim 2, said tapered surfaces being conically shaped.

5. The wing conversion system as claimed in claim 4, said holding element comprising an endless compression ring.

6. The wing conversion system as claimed in claim 1, said drive ring including a plurality of arcuate ring sections arranged circumferentially.

7. The wing conversion system as claimed in claim 6, said holding element comprising an endless compression ring engaging and urging the ring sections toward one another.

8. The wing conversion system as claimed in claim 7, said drive ring and holding element presenting respective conical surfaces that are complementarily shaped and slidably engaged with each other, with axial movement of the holding element relative to the drive ring operable to urge the drive ring axially into engagement with the output shaft and radially into engagement with the spindle.

9. The wing conversion system as claimed in claim 1, said drive elements of the output shaft and the drive ring each including a set of axially extending drive dogs, with the sets of drive dogs being intercalated with one another to restrict relative movement between the output shaft and the drive ring.

10. The wing conversion system as claimed in claim 9, said drive dogs of each set being tapered toward a dog end, with the sets of drive dogs restricting relative rotational and axial movement between the output shaft and the drive ring.

11. The wing conversion system as claimed in claim 1, said spindle having a threaded portion, and a retention nut threaded onto the threaded portion to position the holding element relative to the drive ring.

12. The wing conversion system as claimed in claim 11, said retention nut including an endless body and fasteners shiftably supported by the body, said fasteners being axially shiftable to move the holding element axially relative to the drive ring.

13. The wing conversion system as claimed in claim 11, said retention nut including a locking tab that removably engages the spindle to restrict threading of the retention nut relative to the spindle.

14. The wing conversion system as claimed in claim 13, said retention nut including an endless body that presents a first tab slot to receive the locking tab, said spindle presenting a second tab slot, with the locking tab being removably secured in both tab slots to restrict threading of the retention nut.

15. The wing conversion system as claimed in claim 1, bearing blocks configured to be mounted relative to the wing section and spaced along a length of the spindle, said spindle being rotatably supported by the bearing blocks.

16. The wing conversion system as claimed in claim 15, said conversion actuator being mounted adjacent one of the bearing blocks.

\* \* \* \* \*